(12) United States Patent
Sawaki et al.

(10) Patent No.: US 7,070,700 B2
(45) Date of Patent: Jul. 4, 2006

(54) METHOD OF LASER PROCESSING AND HEAD FOR EJECTING DROPLET

(75) Inventors: Daisuke Sawaki, Nagano-ken (JP);
Masato Shimada, Nagano-ken (JP);
Kazushige Umetsu, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 268 days.

(21) Appl. No.: 10/706,619

(22) Filed: Nov. 12, 2003

(65) Prior Publication Data

US 2004/0129684 A1    Jul. 8, 2004

(30) Foreign Application Priority Data

Nov. 15, 2002   (JP) .............................. 2002-331712

(51) Int. Cl.
*B23K 26/00* (2006.01)
*B41J 2/16* (2006.01)

(52) U.S. Cl. .............................. 216/27; 216/65; 347/20

(58) Field of Classification Search ..................... None
See application file for complete search history.

(56) References Cited

U.S. PATENT DOCUMENTS 3,790,744 A * 2/1974 Bowen ................... 219/121.69
3,909,582 A * 9/1975 Bowen ................... 219/121.69

FOREIGN PATENT DOCUMENTS

EP    0 256 938    2/1988
JP    11-192701 A    7/1999

OTHER PUBLICATIONS

Patent Abstract of Japan Publication No. 11-192701 Published Jul. 21, 1999.

* cited by examiner

*Primary Examiner*—Huan Tran
(74) *Attorney, Agent, or Firm*—Ladas and Parry LLP

(57) ABSTRACT

A method of laser processing for processing a laminated member where a metal thin film is protruded from an end portion of a silicon substrate at the bottom of the silicon substrate, wherein; a laser beam of which wavelength has the light absorption coefficient of the metal thin film being higher than the light absorption coefficient of the silicon substrate, is irradiated onto an boundary between an end of the silicon substrate and the metal thin film so as to cut the metal thin film.

16 Claims, 6 Drawing Sheets

METHOD OF LASER PROCESSING AND HEAD FOR EJECTING DROPLET

BACKGROUND OF THE INVENTION

1. Field of the Invention

The present invention relates to a process using a laser, more specifically, a process for a laminated member where plural different materials are laminated.

2. Related Art

Conventionally, a mechanical process using a press and a drill, a laser process using a laser and an etching process using chemical reaction are unitized for cutting a specific material or hollowing it out among a plural different materials formed as a laminated member to form a predetermined shape (for example, a patent document 1 is referred to).

[The patent document 1]

Japanese Patent Laid-Open No. 11-192701 (Page 10, paragraph 121–122, paragraph 139, paragraph 142, FIG. 5 and FIG. 9)

However, in case of machined configuration formed by a press or a drill, it is difficult to control configuration having complicated and fine changes since it is constrained by a press die and drill configuration. In addition, when machining a hard and brittle material, this is frequently destroyed due to brittle hardness such that high quality cannot be obtained.

In addition, when laser processing, it is necessary to control positioning precisely for irradiating a laser beam along with configuration to be cut. Besides, in order to avoid any damages to areas except a portion to be cut by a laser beam, it is necessary to manage any measures such as installing a photo mask for areas except a portion to be cut.

Furthermore, when etching process, there is a problem of complexity in photolithographic process and additional cost.

In addition, it is necessary to manage cost for processing liquid chemicals and an environmental issue so as to desire more simple processing methods.

In addition, in case of the above method using a metal die or a photo mask, machined configuration is depending on configuration of a metal die or a photo mask, such that it is difficult to efficiently cope with manufacturing products having differences regarding processed dimension or low-volume production of a great variety of items.

SUMMARY OF THE INVENTION

In view of the above mentioned problems, the present invention is intended to provide a method of processing, which manufactures a laminated member where a first material and a second material are laminated and a first material is protruded from a second material, to precisely process a targeted configuration by a simple method without using a die or a photo mask, and a head for ejecting a liquid droplet by using this method.

A method of laser processing of the present invention processes a laminated member where a first material and a second material are laminated and the first material is protruded from the second material, wherein; a laser beam of which wavelength has the light absorption coefficient of the first material being higher than the light absorption coefficient of the second material, is irradiated onto an boundary area between the first material and an end of the second material. According to this method, only the first material protruded from the second material is processed such as cut or removed as its end being a boundary without giving any damages to the second material.

In addition, the laser beam may be defocused and condensed spot of the defocused light beam may be irradiated onto both the first material and the end of the second material. This reduces the necessity of changing a track of laser scanning, even if the position of the end of the second material is changed a little bit within a range to be processed. Hence, precise positioning of a laser irradiation is not strictly requested.

In addition, the laser beam, which is a femto second laser beam, may be irradiated onto a boundary area between the first material and the end of the second material. A femto second laser beam is an ultra short pulse laser beam so as to expect improvement of processed quality.

In addition, a plurality of laser beams having a different wavelength respectively may be irradiated onto a boundary area between the first material and the end of the second material. According to this method, a laser of which each of wavelengths is effective to every material in case when a first material to be processed is composed of a plurality of laminated materials.

In addition, a material, which has the light absorption coefficient being higher than the light absorption coefficient of the second material, may be coated over a processed portion in the first material. Otherwise, a plurality of minute uneven portions may be formed on the surface of a processed portion in the first material. According to this method, the light absorption coefficient of the first material is increased so as to process only the first material, even if the difference between the light absorption coefficient of the first material and that of the second material is small.

In addition, the direction of irradiating the laser beam to the laminated member may be adjustable, for example, enabling a laser beam to be irradiated from an appropriate direction depending on configuration or constitution of a portion to be processed. In addition, reattaching of materials scattered by the processing to the laminated member can be reduced by changing the direction of scattering of the scattered materials.

In addition, when an airflow for blowing materials scattered by the processing toward the outside of the laminated member is supplied, reattaching of the scattered materials to the laminated member can be prevented.

Further, the laser beam is irradiated onto the laminated member in a vacuum so as to improve processed quality.

Further the laser beam may be irradiated onto the laminated member, scanning the laser by using a galvanic mirror. This enables a laser beam to be irradiated with high precision under a simple structure.

The laser beam may be branched off and the branched plurality of beams may be irradiated onto the laminated member at the same time. This improves efficiency of processing.

In addition, a portion to be processed in the laminated member may be shot by a camera and the image thereof may be processed such that the position to be irradiated with a laser beam may be determined thereby. This method can attain minute processing.

In addition, as an example of the above laminated member, first material may be a metal, and the second material may be silicon. The first material may be silicon, and the second material may be a glass. The second material may be a cavity substrate for a head of ejecting a droplet provided with a concave portion functioning as a reservoir for a liquid material and the first material may be a multi-layered film of which layers are deposited on the bottom of the reservoir of the cavity substrate.

A head for ejecting a droplet of the present invention comprises a reservoir for a liquid material formed by the above method.

In addition, the present invention is a method of laser processing for processing a boundary area composed of materials having different light absorption coefficients, wherein a laser beam of which wavelength has the light absorption coefficient of a second material being higher than the light absorption coefficient of a first material, is irradiated onto the boundary area.

By doing so, the second material having higher light absorption coefficient is easily processed and the processing this second material along with the boundary area is easy, enabling processing which is fit into the configuration of the boundary area, even if such configuration is complicated.

The present invention is a method of laser processing comprising; a step of forming a boundary area with a first material having first light absorption property with respect to a laser beam and a second material having second light absorption property, which is different from the first light absorption property; a step of processing one of the first material and/or the second material by irradiating the laser beam onto the boundary area.

The light absorption property mainly indicates light absorption coefficient. It is possible to process a material by using different light absorption properties among materials, enabling the processing to be fit into the configuration of the boundary area.

In addition, it is possible to change a material to be processed, by changing the wavelength of a laser beam so as to fit into the light absorption property of each material to be processed.

DESCRIPTION FOR PREFERRED EMBODIMENTS

The present invention is a method of processing a first material in a laminated member where the first material layer and a second material layer are laminated and the first material is protruded from the second material. Further, the end of the second material is utilized as a guide when processing the first material (cutting, removing, hollowing and others) by paying attention to the difference among the light absorption coefficients in layers of a laminated member. Therefore, a laser beam having a wavelength of which light absorption coefficient is high to the first material layer (a layer to be processed), but is low to the second material (a guide layer), is selected. This laser beam is condensed by a lens and others and irradiated onto the boundary area between the end of the second material, which is a guide, and the first material. In this case, a part of a condensed spot of a laser beam may cover an end portion of the second material layer, which is a guide. In addition, a condensed spot of a laser beam and a laminated member are moved relatively if it is necessary. Hence, only the first material having the high light absorption coefficient is removed selectively within a condensed spot such that the first material layer can be processed precisely along with the end portion of the second material layer without adjusting scanned track of a irradiated laser beam along with the configuration of the second material layer with high precision, even if there are small amount of errors or variation in the configuration of the second material layer.

Embodiment 1

Figure 1:
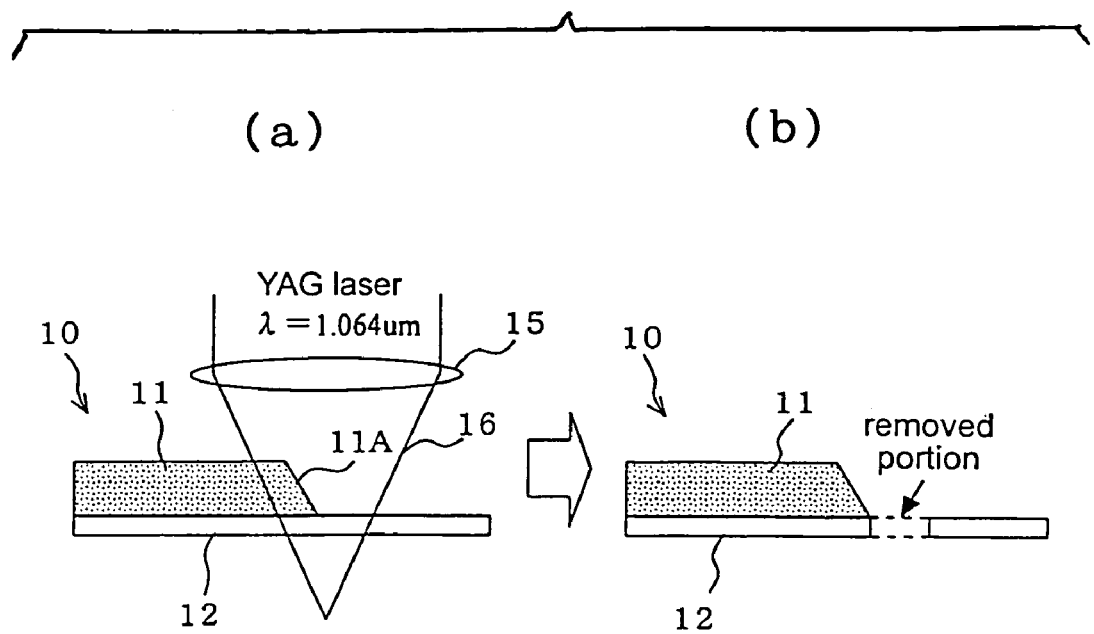
FIG. 1 shows a schematic view of processing in a method of an embodiment 1 of the present invention.

FIG. 1 shows a schematic drawing of processing with respect to the first embodiment of the present invention. A laminated member 10, an object to be processed, is a member where a metal thin film 12 is laminated on a silicon substrate 11 and the metal thin film 12 (a multi-layered film where different kinds of materials are laminated may be replaceable) is protruded from the bottom of the silicon substrate 11. An object to be processed of this laminated member is the metal thin film 12 and an end portion 11A of the silicon substrate 11 is used as a guide when processing. Therefore, a laser beam of wavelength of which light absorption coefficient is high to the metal thin film 12 and low to the silicon substrate 11, is used for processing. Here, a fundamental wave laser beam of YAG laser of which wavelength is 1.064 µm, is used.

While, in actual processing, as shown in (a) of FIG. 1, a laser beam 16 is condensed by a lens 15 and irradiated in a manner that its condensed spot covers both the end portion 1A of the silicon substrate 11 and the metal thin film 12, while the condensed spot is scanned along the end portion 11A of the silicon substrate 11, otherwise the laminated member 10 is moved. Hence, as shown in (b) of FIG. 1, only a part of the metal thin film 12 having high light absorption coefficient among the laminated member, irradiated with a laser beam, is removed as a state of alignment performed by the end portion 11A of the silicon substrate 11.

Generally, a laser beam is also irradiated onto the metal thin film 12, which is located directly below the silicon substrate 11. But its strength is reduced because of damping when the laser beam penetrates through the silicon substrate 11. Therefore, laser energy stored in the metal thin film 12 located directly below the silicon substrate 11 is less than the threshold value, which can process the metal thin film 12 such that the metal thin film 12 located directly below the silicon substrate 11 is not processed.

Embodiment 2

Figure 2:
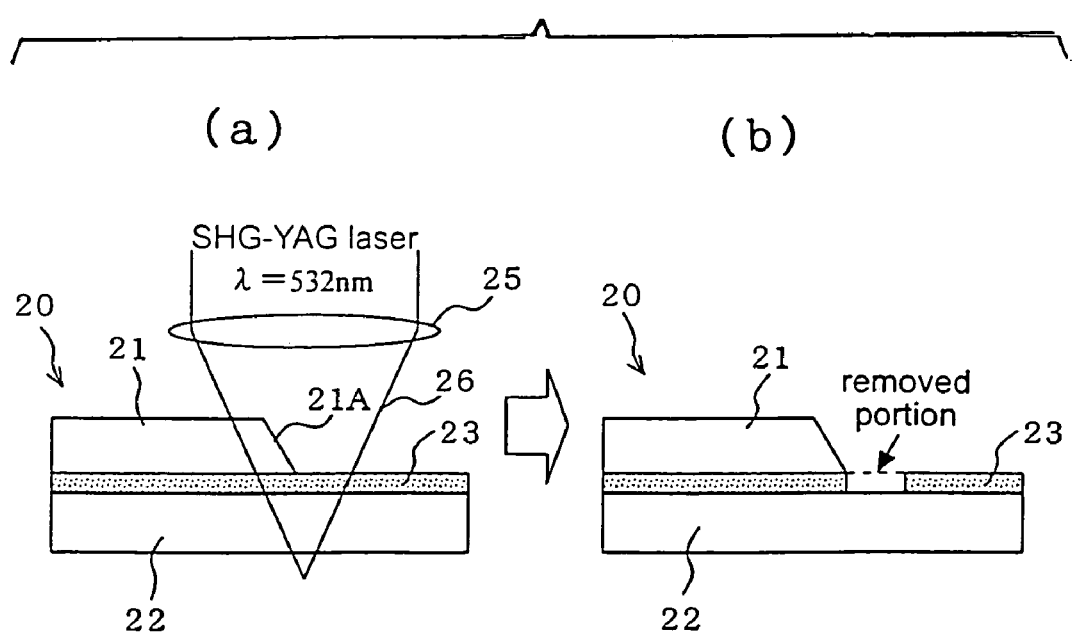
FIG. 2 shows a schematic view of processing in a method of an embodiment 2 of the present invention.

FIG. 2 shows a schematic view of processing regarding an embodiment 2 of the present invention. A laminated member 20, an object to be processed, is a member where a silicon layer 23 is deposited between a upper and lower glass substrates 21 and 22 and the silicon layer 23 is protruded from the bottom of the upper glass substrate 21. In this laminated member 20, an actual object to be processed is the silicon layer 23, and the end portion 21A of the upper glass substrate 21 is utilized as a guide when processing. Therefore, a laser beam of wavelength of which light absorption coefficient is high to the silicon layer 23, and low to the glass substrates 21 and 22, is used for processing. Here, a second harmonic laser beam of YAG laser of which wavelength is 532 nm is used.

In actual processing, as shown in (a) of FIG. 2, a laser beam 26 is condensed with a lens 25 and irradiated in a manner that this condensed spot covers both the end portion 21A of the upper glass substrate 21 and the silicon layer 23. Further, the condensed spot is scanned along with the end portion 21A of the upper glass substrate 21, or the laminated member 20 is moved. Hence, as shown in (b) of FIG. 2, laser energy surpassing the threshold for processing is stored in a portion of the silicon layer 23 having high light absorption coefficient, which is protruded from the upper glass substrate 21 among the laminated member 20 irradiated by a laser beam. Such corresponding portion of the silicon layer 23 is removed as the alignment state performed with the end portion 21A of the upper glass substrate 21.

Embodiment 3

Figure 3:
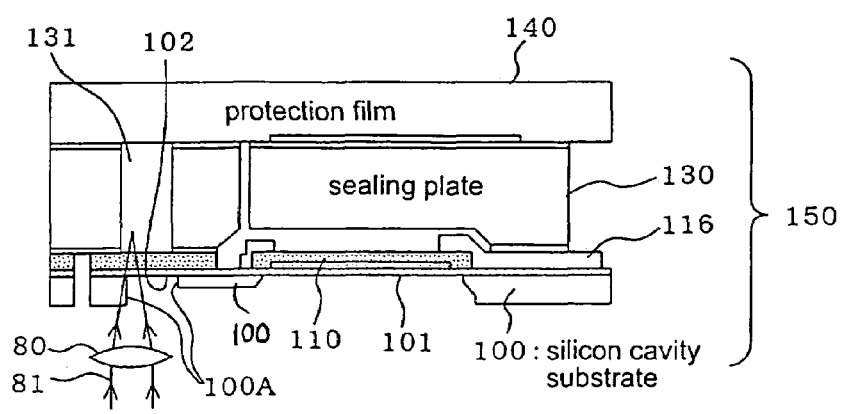
FIG. 3 shows a part of process for manufacturing an ink jet head regarding a method of an embodiment 3 in the present invention.
Figure 3:
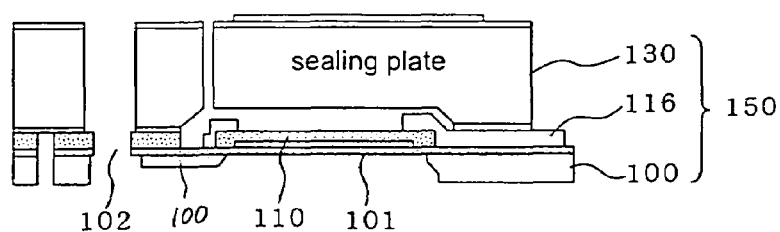
Figure 3:
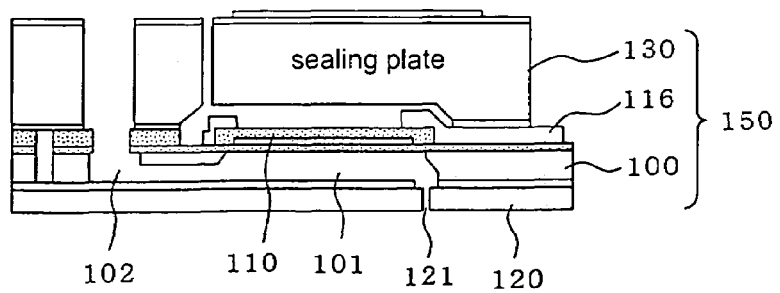

FIG. 3 shows a process flow showing a part of manufacturing a piezoelectric type ink jet head, which ejects ink droplets by using displacement of a piezo electric element. Here, as an example of a head of ejecting ink droplets, a piezoelectric type ink jet head is cited. But, the present invention can be applied to other types of ink jet heads, or heads of ejecting liquid except ink. As already well known, a piezoelectric type ink jet head comprises; a cavity substrate including a ink reservoir for taking ink from the outside and storing it and a cavity of a pressure generating chamber for generating pressure to eject ink from a nozzle with connecting to the ink reservoir; a multi-layered film including piezoelectric element to generate actual pressure change accompanied with constituting a part of the above pressure generating chamber with forming layers on the cavity substrate; a nozzle plate including nozzle holes; and sealing plate (or fixing plate) of sealing a part of a multi-layered film and fixing the cavity substrate.

Next, a method of manufacturing a piezoelectric type ink jet head is described. In addition, in FIG. 3, a reference numeral 150 is a member to be a ink jet head in the future, but this 150 is referred to as a ink jet head here as a matter of convenience. In the ink jet head 150, a multi-layered film 110, described later, which will be a piezo electric element, is deposited on a silicon cavity substrate 100 by previous process. Further, a sealing plate 130 made of silicon, for example, is fixed on the side of the multi-layered film 110 in the silicon cavity substrate 100. In this sealing plate 130, a reservoir 131 on sealing plate side is formed to intake ink supplied from outside.

In (a) of FIG. 3, after coating a protecting film 140 over the sealing plate 130, the cavity substrate 100 is etched to form a pressure-generating chamber 101 and a concave portion corresponding to a reservoir 102 on a cavity substrate side and others. Then, the multi-layered film 110, which partitions a reservoir 102 on a cavity substrate side and a reservoir 131 on sealing plate side, is hollowed by using a laser beam 81 in order to connecting the reservoir 102 on a cavity substrate side to the reservoir 131 on sealing plate side with penetration as the same way in the embodiment 1. This multi-layered film 110 is hollowed in a manner that a laser beam is irradiated onto the boundary area between the end portion 100A of the silicon cavity substrate 100 and the multi-layered film 110 and this laser goes around along the end portion 100A so as to hollow the multi-layered film 110 along the end portion 100A. The ink jet head 150 under the state when the multi-layered film 110 is hollowed and the protecting film 140 is removed, is shown in (b) of FIG. 3. Subsequently, as shown in (c) of FIG. 3, a nozzle plate 120 provided with a nozzle hole 121 is attached to the opened side of the concave portion in the silicon cavity substrate 100 in a manner that the nozzle hole 121 is located at the position in response to the nozzle pressure generating chamber 101. In addition, a final product of the ink jet head 150 is completed after wire bonding, mounting a case head, assembling a substrate head, incorporating component parts and the like.

By the way, in this embodiment 3, the silicon cavity substrate 100 and the multi-layered film 110 are corresponding to the silicon substrate 11 and the metal thin film 12 in the embodiment 1 respectively.

Figure 4:
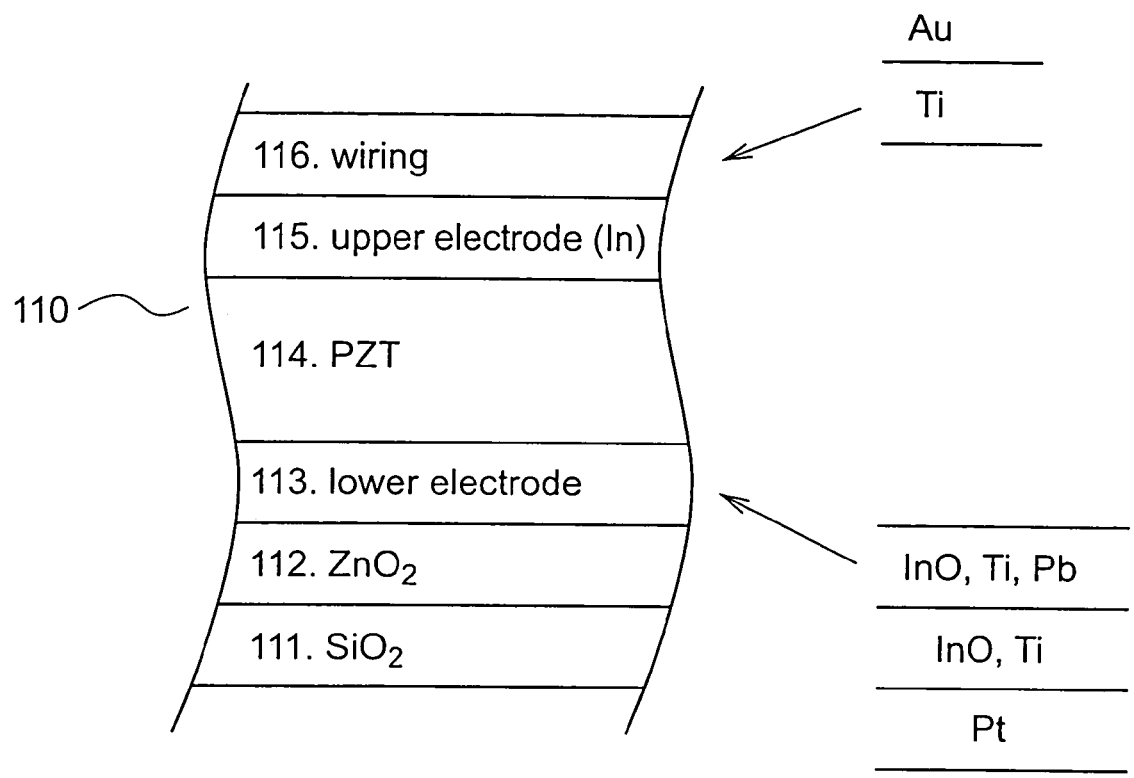
FIG. 4 is an explanatory drawing of hollowing a multi-layered film by a method of the embodiment 3 of the present invention.

The thickness of the silicon cavity substrate 100 is about 70 μm, and the thickness of the multi-layered film 110 is about 1–5 μm for example. In addition, one example of concrete constitution of the multi-layered film 110 is shown in FIG. 4. According to this structure, from the side close to the silicon cavity substrate 100, this film comprises a SiO2 (silicon dioxide) layer 111, a ZnO2 (zinc peroxide) layer 112, a lower electrode 113, a PZT (lead zirconate titanate) layer 114, an upper electrode 115 and a wiring 116. The lower electrode 113 is composed of a Pt (platinum) layer, InO (oxidation indium) and Ti (titanium) layers, InO, Ti and Pb (plumber) layers. In addition, the upper electrode 115 is composed of In (indium) and the wiring 116 is composed of Au and titanium. When this multi-layered film 110 is hollowed, a penetrated hole of which boundary is formed by the end 100A of the silicon cavity substrate 100 can be formed with high quality and without destruction due to hard and brittle mode. In addition, after this hollowing, it is necessary that the nozzle plate 120 be adhered to the silicon cavity substrate 100 within a range of extremely minute error. However, a laser beam irradiated previously was selected so as to avoid any damages to the silicon cavity substrate 100. Hence, the surface of the silicon cavity substrate 100 does not give adverse effect to adhesion of the nozzle plate 120. Therefore, the ink jet head 150 where the reservoir 102 on a cavity substrate side is connected to the reservoir 131 on sealing plate side with penetration contributes improvement on stability of ink ejection performance.

In the meantime, in the above-mentioned each of embodiments, a radius of a irradiated spot of the laser beam may be enlarged by defocusing for shifting a convergent position, adjusting the focal length f of a lens, or the changing the radius of an incident beam to a condensing lens. Then, it is possible to easily position a laser beam to the boundary area between the end portion 11A, 21A, and 100A of a guide layers and processed layers 12, 23 and 110. In addition, in defocusing, it is desirable in view of process quality that processed portion of a laminated member is installed between a condensing lens and a point of a laser beam condensed by this condensing lens. In addition, an irradiated laser beam used for processing is not necessarily a condensed laser beam.

Further, the following means may be adopted in each embodiment. For example, a plurality of laser beams having a different wavelength respectively may be irradiated to the boundary area between the end portion of a guide layer and a processed layer. Hence, when a processed layer comprises a plurality of multiple material layers, it is possible to give a laser beam having wavelengths each of which is efficient to each of materials so as to expand the kind of processed objects.

In addition, when the difference between the light absorption coefficient of a processed layer and that of a guide layer is small, a material having a light absorption coefficient, which is larger than that of a processed layer, for example, black ink may be coated over a processed layer. Otherwise, a plurality of uneven portions may be formed in a processed surface of a processed layer. In that case, a difference between the top and the bottom of the uneven portions is smaller than the wavelength of a laser beam, since the uneven portions are for restraining light reflection. Based on these procuresses, the difference between the light absorption coefficient of a processed layer and that of a guide layer becomes large, and only the processed layer is processed without giving any damages to the guide layer.

Further, the direction of a laser beam irradiation may be adjustable. Therefore, it is possible to irradiate a laser beam to a processed portion having a complicated structure. In addition, it is possible to adjust the direction of irradiating a laser beam so as to reduce reattaching of materials scattered by the processing to a laminating member.

Furthermore, an airflow blowing materials scattered by the processing toward the outside of a laminated member may be applied to an area close to a processed portion of the laminated member. In addition, when a laser beam is irradiated onto a laminated member in a vacuum, oxidation is prevented and generation of dross is restrained, enabling processed quality to be improved.

The effects of the above mentioned laser processing are as follows. A processed edge of the processed layer at the edge of a guide layer is self aligned, enabling the accuracy for positioning a beam spot in a processing apparatus to be reduced. And processing with high accuracy can be attained even if it is a process for complicated configuration.

In addition, a die and a mask specifically prepared are unnecessary such that this can handle low-volume production of a great variety of items. Manufacturing process can be simplified since pre processing is unnecessary in manufacturing.

An Apparatus for Laser Processing Used by the Present Invention

Here, a constitutional example of an apparatus for laser processing used in the present invention is described. An apparatus for laser processing 50 comprises a laser oscillator 51 to be a energy source, a beam expander 52 for magnifying a radius of beam of a laser emitted from the laser oscillator 51, a laser intensity regulator 53 for adjusting intensity of laser beam having enlarged radius, a mirror 54 for adjusting the direction of light ongoing (the number of them is optional), a triple axis automatic stage 56, which is movable to X, Y and Z direction with mounting a work 10, 20, and 150 to be processed, a stage controller 57 for controlling operation of the triple axis automatic stage 56 and a PC 58 for controlling the stage controller 57. In addition, the kind of a laser beam emitted from the laser oscillator 51 and its wavelength are determined depending on material of layers functioning a guide and a material of a layer to be processed in actual.

Figure 6:
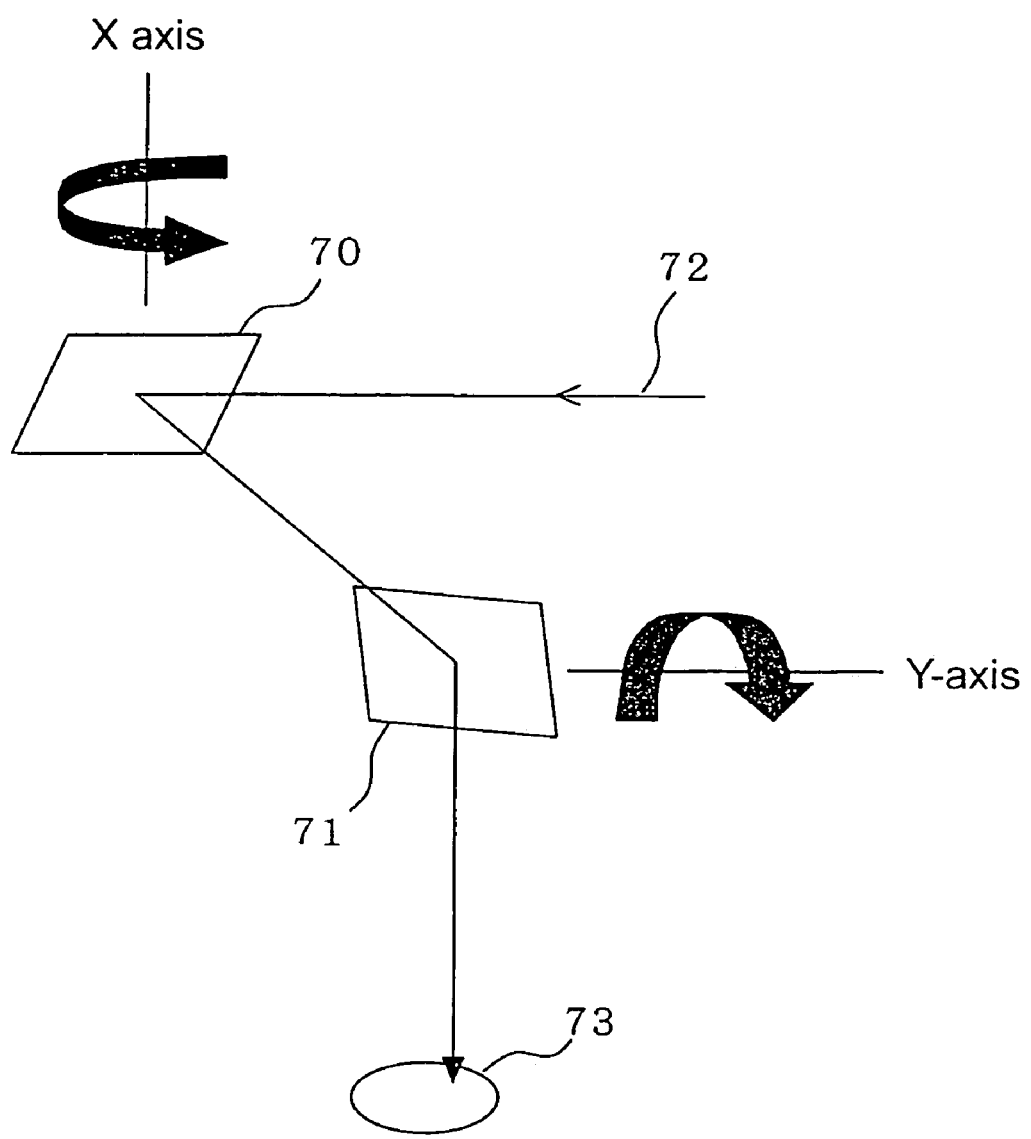
FIG. 6 shows a constitutional drawing for scanning a irradiated laser.

In this apparatus 50, a work and a laser beam irradiated onto the work are relatively moved by moving a triple axis automatic stage 56. But the laser may be scanned. As a means of scanning a laser beam, combination of two galvanic mirrors can be utilized as shown in FIG. 6. In FIG. 6, a first galvanic mirror 70 rotates with respect to X axis and a second galvanic mirror 71 rotates with respect to Y axis. Both mirrors 70 and 71 are arranged at a predetermined position with high accuracy and moved synchronously with a driving means (not shown in the figure). In this apparatus having these galvanic mirrors 70 and 71, a laser beam 72 oscillated by a laser oscillator (not shown in the figure) is reflected at the first galvanic mirror 70 and the second galvanic mirror 71 thereafter. Then, it is condensed by a condensed lens and irradiated onto a work to be processed. Here, the condensed spot of an irradiated laser beam is scanned along the end of a layer as a guide, making a hole hollowed in response to a scanning track 73. In a case of laser processing, instead that a work to be processed is moved and cut as a predetermined shape, a laser beam irradiated onto a work to be processed, is scanned for cutting a work to be processed as a predetermined shape, enabling process accuracy to be enhanced and manufacturing efficiency to be improved with appropriateness for mass production.

Figure 5:
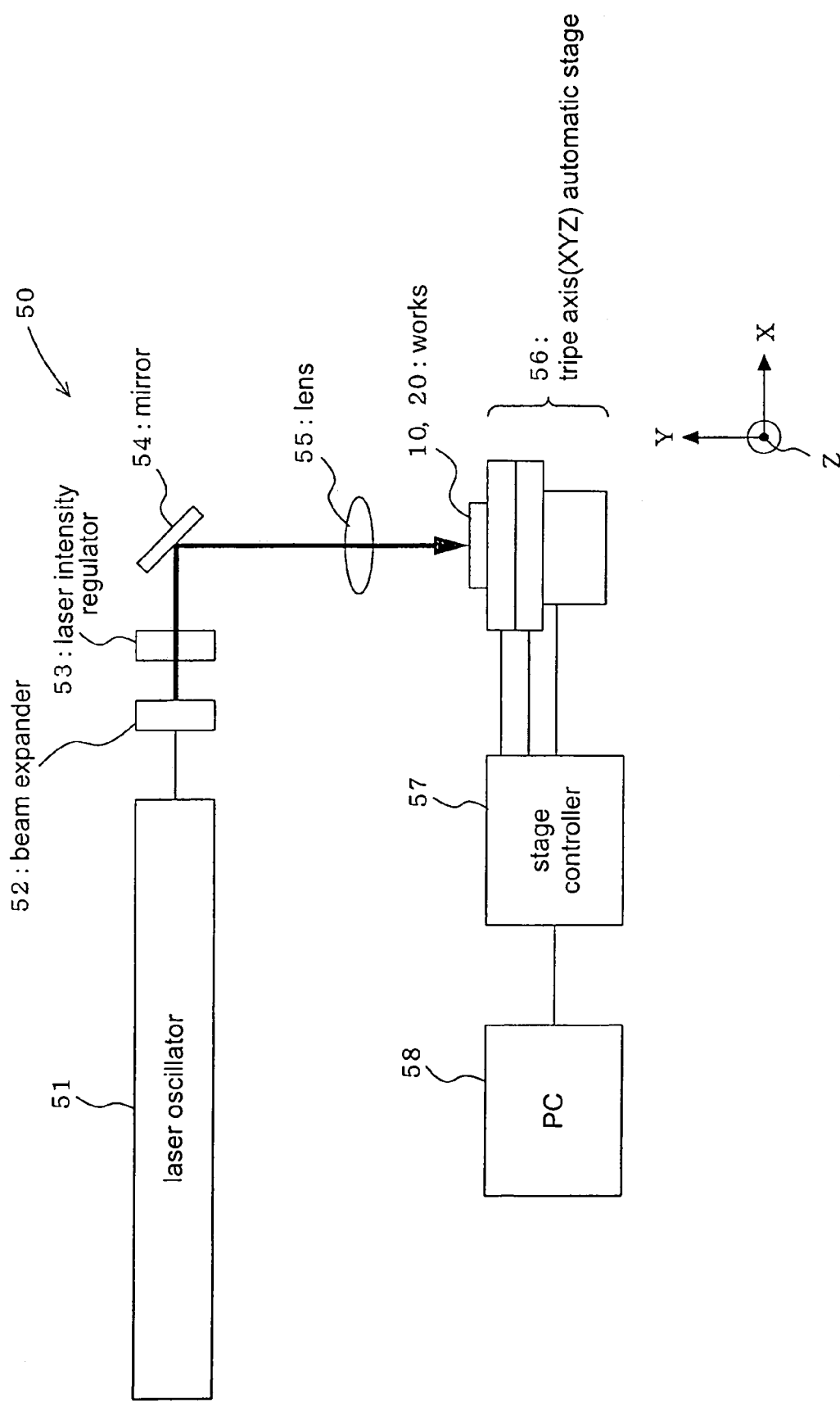
FIG. 5 shows a structure of an apparatus for laser processing which is available in the above-mentioned embodiment.
Figure 7:
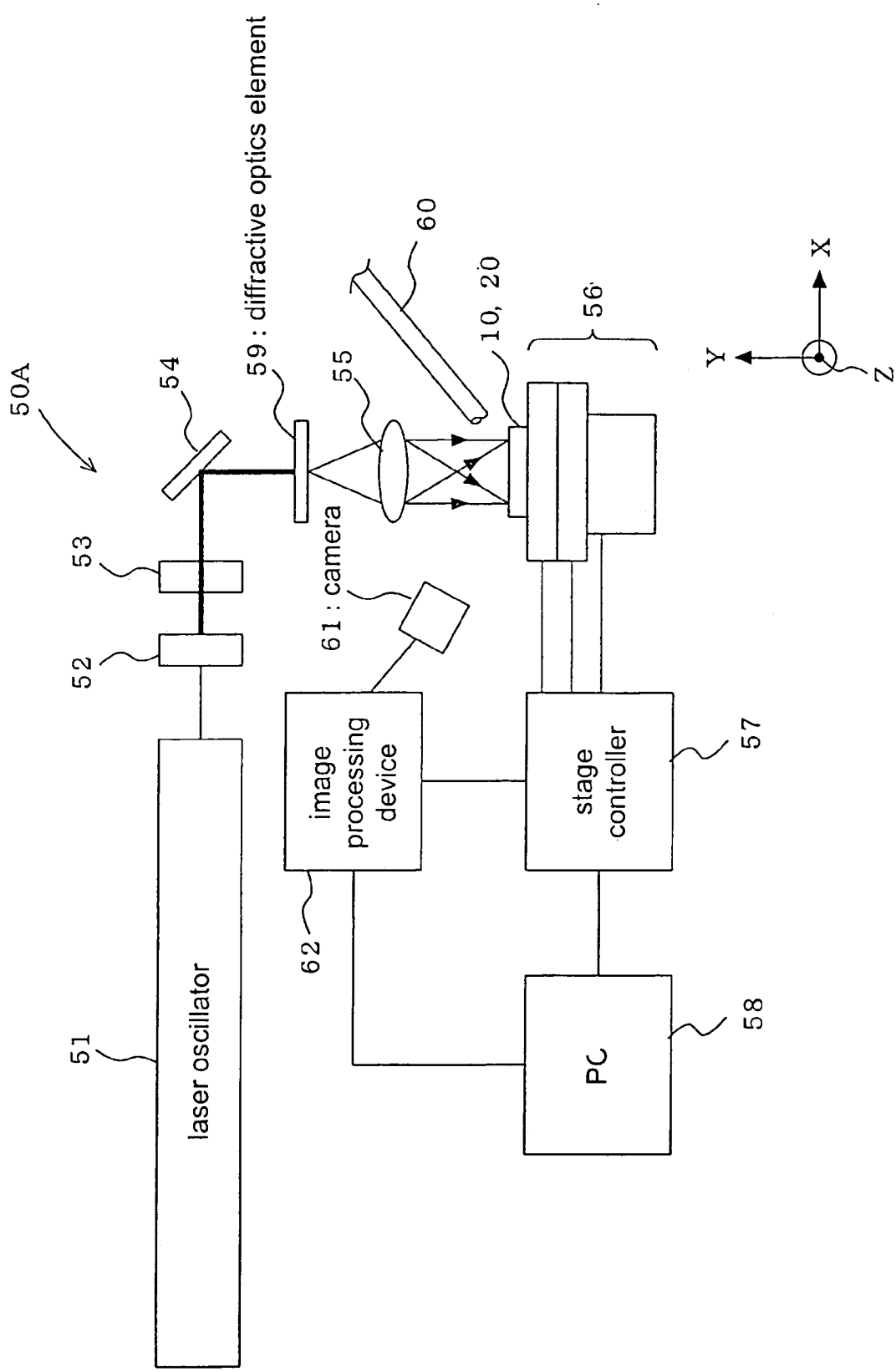
FIG. 7 is another structures of an apparatus for laser processing, which is available in the above-mentioned embodiment.

FIG. 7 shows another constitution of an apparatus for laser processing which is available in the above-mentioned embodiments. This apparatus for laser processing 50A is provided with some additional components functioning as further efficiency in addition to constituents in the apparatus for laser processing 50 in FIG. 5. For example, when there are a plurality of works having the same configuration to be processed such as works 10, 20 and 150, it is effective if a laser beam is irradiated onto these works each at the same time. In order to attain it, a diffractive optics element 59 for branching a laser beam into plural beams is disposed in the front of the condenser lens 55. In addition, as means for branching a laser beam into plural beams, half mirror can also be used. In addition, an absorption apparatus 60 for absorbing materials scattered during a process is located close to a work to be processed.

Furthermore, it is provided with a camera for shooting a portion to be processed in the works 10,20 and 150 and an image processing device 62, which determines the boundary area between the end portion of a guide layer and a layer to be processed based on a image shot by the camera 61 and computes the path of laser beam irradiation. The path of laser beam irradiation computed by the image-processing device 62 is transferred by a stage controller 57 and used for controlling and driving the triple axis automatic stage 56.

Here, the diffractive optics element 59, the absorption apparatus 60, the camera 61 and the image processing system 62 may be adopted depending on necessity individually instead using all of them.

In the above embodiment, a fundamental wave of a YAG laser, a second higher harmonics of it were used for a laser beam, but a laser beam for processing is determined depending on material of the guide layer and a material of a layer to be processed in actual. For example, a fundamental wave and a higher harmonics of YLF laser beam, a fundamental wave and a higher harmonics of YVO 4 laser beam, and CO2 laser beam may be examined. In addition, use of a femto second pulse laser beam may be considered from processing quality. In addition, in selecting a laser used for processing, the difference of energy accumulation rate among components in a laminated member and the energy threshold value at the time of starting a process with laser energy among components in a laminated member should be considered. In other words, it is necessary that laser energy more than the threshold value is accumulated in a member to be processed, while laser energy more than the threshold value is not accumulated in a member to be used as a guide.

In addition, in each of the above embodiments, processing was completed under the state when a layer to be processed and a guide layer are laminated toward horizontal direction. However, the present invention includes a process where a layer to be processed is processed by irradiating a laser onto the boundary of a layer to be processed and a guide layer as them being erected when these layers are laminated toward the vertical direction.

What is claimed is:

1. A method of laser processing for processing a laminated member where a first material and a second material are laminated and the first material is protruded from the second material, wherein; a laser beam of which wavelength has the light absorption coefficient of the first material being higher than the light absorption coefficient of the second material, is irradiated onto an boundary area between the first material and an end of the second material.

2. The method of laser processing claimed in claim 1, wherein the laser beam is defocused and condensed spot of the defocused light beam is irradiated onto both the first material and the end of the second material.

3. The method of laser processing claimed in claim 1, wherein; the laser beam, which is a femto second laser beam, is irradiated onto a boundary area between the first material and the end of the second material.

4. The method of laser processing claimed in claim 1, wherein; a plurality of laser beams having a different wavelength respectively are irradiated onto a boundary area between the first material and the end of the second material.

5. The method of laser processing claimed in claim 1, wherein; a material, which has the light absorption coefficient being higher than the light absorption coefficient of the second material, is coated over a processed portion in the first material.

6. The method of laser processing claimed claim 1, wherein; a plurality of minute uneven portions are formed on the surface of a processed portion in the first material.

7. The method of laser processing claimed claim 1, wherein; the direction of irradiating the laser beam to the laminated member is adjustable.

8. The method of laser processing claimed claim 1, wherein; an airflow blowing materials scattered by the processing toward the outside of the laminated member is supplied.

9. The method of laser processing claimed in claim 1, wherein; the laser beam is irradiated onto the laminated member in a vacuum.

10. The method of laser processing claimed in claim 1, wherein; the laser beam is irradiated onto the laminated member, scanning the laser by using a galvanic mirror.

11. The method of laser processing claimed in claim 1, wherein; the laser beam is made to be branched off and the branched plurality of beams are irradiated onto the laminated member at the same time.

12. The method of laser processing claimed in claim 1, wherein; a portion to be processed in the laminated member is shot by a camera and an image thereof is processed such that the position to be irradiated with a laser beam is determined thereby.

13. The method of laser processing claimed in claim 1, wherein; the first material is a metal, and the second material is silicon.

14. The method of laser processing claimed in claim 1, wherein; the first material is silicon, and the second material is a glass.

15. The method of laser processing claimed in claim 1, wherein; the second material is a cavity substrate for a head of ejecting a droplet provided with a concave portion functioning as a reservoir for a liquid material and the first material is a multi-layered film of which layers are deposited on the bottom of the reservoir of the cavity substrate.

16. A head for ejecting a droplet comprising a reservoir for a liquid material formed by the method claimed in claim 15.

* * * * *